United States Patent
He et al.

(10) Patent No.: US 11,949,063 B2
(45) Date of Patent: Apr. 2, 2024

(54) FLAME-RESISTANT QUASI-SOLID HYBRID ELECTROLYTE FOR SAFE ANODE-LESS LITHIUM BATTERIES AND PRODUCTION METHOD

(71) Applicant: Global Graphene Group, Inc., Dayton, OH (US)

(72) Inventors: Hui He, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 368 days.

(21) Appl. No.: 17/014,649

(22) Filed: Sep. 8, 2020

(65) Prior Publication Data

US 2022/0077490 A1   Mar. 10, 2022

(51) Int. Cl.
| | |
|---|---|
| *H01M 10/056* | (2010.01) |
| *H01M 4/139* | (2010.01) |
| *H01M 4/66* | (2006.01) |
| *H01M 10/0525* | (2010.01) |

(52) U.S. Cl.
CPC ......... *H01M 10/056* (2013.01); *H01M 4/139* (2013.01); *H01M 4/663* (2013.01); *H01M 4/667* (2013.01); *H01M 10/0525* (2013.01); *H01M 2300/002* (2013.01); *H01M 2300/0028* (2013.01); *H01M 2300/0082* (2013.01)

(58) Field of Classification Search
CPC .... H01M 10/056; H01M 4/139; H01M 4/663; H01M 4/667; H01M 10/0525; H01M 2300/002; H01M 2300/0028; H01M 2300/0082; H01M 4/0447; H01M 4/661; H01M 50/437; H01M 10/052; H01M 10/0567; H01M 10/0568; H01M 10/0569
See application file for complete search history.

(56) References Cited

U.S. PATENT DOCUMENTS

| | | |
|---|---|---|
| 2,798,878 A | 7/1957 | Hummers |
| 5,532,077 A | 7/1996 | Chu |
| 8,865,040 B2 | 10/2014 | Jang et al. |
| 9,059,481 B2 | 6/2015 | He et al. |

(Continued)

OTHER PUBLICATIONS

Chinese Patent Application No. 2020800740936; Chinese Office Action dated Dec. 2, 2022; 8 pages.

(Continued)

*Primary Examiner* — Stewart A Fraser

(57) ABSTRACT

A rechargeable lithium cell comprising: (a) a cathode having a cathode active material and a first electrolyte in ionic contact with the cathode active material; (b) an anode having an anode current collector but no anode active material and having no lithium metal when the cell is made; (c) an optional porous separator electronically separating the anode and the cathode; and (d) a second electrolyte, comprising a polymer electrolyte in ionic contact with the first electrolyte, wherein the polymer electrolyte is disposed substantially between the anode and the cathode, between the separator and the cathode, and/or between the separator and the anode. The polymer electrolyte substantially does not permeate into the anode or the cathode. Also provided is a method of preparing or operating such an anode-less lithium cell.

33 Claims, 5 Drawing Sheets

Discharged state (or as manufactured)

(56) References Cited

U.S. PATENT DOCUMENTS

| | | |
|---|---|---|
| 9,362,018 B2 | 6/2016 | Zhamu et al. |
| 9,368,831 B2 | 6/2016 | He et al. |
| 9,382,117 B2 | 7/2016 | Zhamu et al. |
| 9,601,803 B2 | 3/2017 | He et al. |
| 9,601,805 B2 | 3/2017 | He et al. |
| 9,790,334 B2 | 10/2017 | Clauss et al. |
| 9,847,184 B2 | 12/2017 | Zhamu et al. |
| 2007/0167556 A1 | 7/2007 | Noguchi et al. |
| 2014/0124176 A1 | 5/2014 | Zhamu et al. |
| 2017/0182474 A1 | 6/2017 | Zhamu et al. |
| 2017/0225233 A1 | 8/2017 | Zhamu et al. |
| 2018/0050914 A1 | 2/2018 | Zhamu et al. |
| 2018/0053930 A1 | 2/2018 | Zhamu et al. |
| 2018/0053931 A1 | 2/2018 | Zhamu et al. |
| 2018/0054921 A1 | 2/2018 | Zhamu et al. |
| 2018/0135200 A1 | 5/2018 | Zhamu et al. |
| 2018/0179056 A1 | 6/2018 | Kim |
| 2018/0277894 A1* | 9/2018 | Pan ................... H01M 10/0569 |
| 2019/0214672 A1* | 7/2019 | Chang ............... H01M 10/0585 |
| 2020/0036043 A1* | 1/2020 | Ishikawa ........... H01M 10/0569 |

OTHER PUBLICATIONS

International Application No. PCT/US2020/048974; International Preliminary Report on Patentability; 10 pages.

PCT/US20/48974 International Search Report and Written Opinion dated Dec. 16, 2020, 14 pages.

U.S. Appl. No. 16/559,004; Non-Final Office Action dated Jun. 14, 2022; 18 pages.

U.S. Appl. No. 16/559,004; Final Office Action dated Nov. 28, 2022, 22 pages.

\* cited by examiner

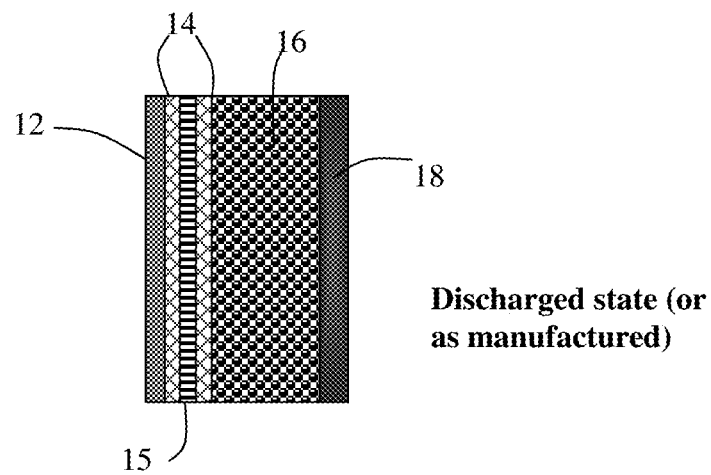
FIG. 2(A) Discharged state (or as manufactured)
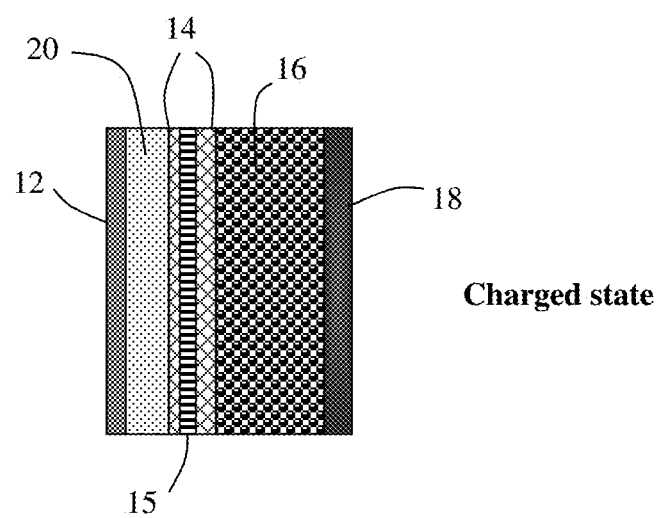
FIG. 2(B) Charged state

FLAME-RESISTANT QUASI-SOLID HYBRID ELECTROLYTE FOR SAFE ANODE-LESS LITHIUM BATTERIES AND PRODUCTION METHOD

FIELD

The present disclosure provides a fire-resistant hybrid electrolyte composition and a lithium battery (primary and secondary battery) containing such a hybrid electrolyte composition.

BACKGROUND

Rechargeable lithium-ion (Li-ion), lithium metal, lithium-sulfur, and Li metal-air batteries are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than lithium-ion batteries (having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries.

Even now, cycling stability and safety concerns remain the primary factors preventing the further commercialization of Li metal batteries (e.g. Lithium-sulfur and Lithium-transition metal oxide cells) for EV, HEV, and microelectronic device applications. Again, cycling stability and safety issues of lithium metal rechargeable batteries are primarily related to the high tendency for Li metal to form dendrite structures during repeated charge-discharge cycles or overcharges, leading to internal electrical shorting and thermal runaway. This thermal runaway or even explosion is caused by the organic liquid solvents used in the electrolyte (e.g. carbonate and ether families of solvents), which are unfortunately highly volatile and flammable.

Many attempts have been made to address the dendrite and thermal runaway issues. However, despite these earlier efforts, no rechargeable Li metal batteries have succeeded in the market place. This is likely due to the notion that these prior art approaches still have major deficiencies. For instance, in several cases, the anode or electrolyte structures designed for prevention of dendrites are too complex. In others, the materials are too costly or the processes for making these materials are too laborious or difficult. In most of the lithium metal cells and lithium-ion cells, the electrolyte solvents are flammable. An urgent need exists for a simpler, more cost-effective, and easier to implement approach to preventing Li metal dendrite-induced internal short circuit and thermal runaway problems in Li metal batteries and other rechargeable batteries.

Parallel to these efforts and prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost, safety, and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-185 mAh/g. As a result, the specific energy of commercially available Li-ion cells is typically in the range from 120-240 Wh/kg, most typically 150-220 Wh/kg. These specific energy values are two to three times lower than what would be required for battery-powered electric vehicles to be widely accepted.

Furthermore, the same flammable solvents previously used for lithium metal secondary batteries are also used in most of the lithium-ion batteries. Despite the notion that there is significantly reduced propensity of forming dendrites in a lithium-ion cell (relative to a lithium metal cell), the lithium-ion cell has its own intrinsic safety issue. For instance, the transition metal elements in the lithium metal oxide cathode are highly active catalysts that can promote and accelerate the decomposition of organic solvents, causing thermal runaway or explosion initiation to occur at a relatively low electrolyte temperature (e.g. <200° C., as opposed to normally 400° C. without the catalytic effect).

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself during repeated charges and discharges. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

With the rapid development of hybrid (HEV), plug-in hybrid electric vehicles (HEV), and all-battery electric vehicles (EV), there is an urgent need for anode and cathode materials and electrolytes that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li^\circ$. This electrochemical potential is approximately ⅔ of that exhibited by conventional positive electrodes. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Values can approach 2,500 Wh/kg or 2,800 Wh/l based on the combined Li and S weight or volume (not based on the total cell weight or volume), respectively, assuming complete reaction to $Li_2S$. With a proper cell design, a cell-level specific energy of 1,200 Wh/kg (of cell weight) and cell-level energy density of 1,400 Wh/l (of cell volume) should be achievable. However, the current Li-sulfur products of industry leaders in sulfur cathode technology have a maximum cell specific energy of 400 Wh/kg (based on the total cell weight), far less than what could be obtained in real practice.

In summary, despite its considerable advantages, the rechargeable lithium metal cell in general and the Li—S cell and the Li-air cell in particular are plagued with several major technical problems that have hindered its widespread commercialization:
  (1) Conventional lithium metal secondary cells (e.g., rechargeable Li metal cells, Li—S cells, and Li-Air cells) still have dendrite formation and related internal shorting and thermal runaway issues. Also, conventional Li-ion cells still make use of significant amounts of flammable liquids (e.g. propylene carbonate, ethylene carbonate, 1,3-dioxolane, etc) as the primary electrolyte solvent, risking danger of explosion;
  (2) The Li—S cell tends to exhibit significant capacity degradation during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator and electrolyte to the Li negative electrode whereupon they are reduced to solid precipitates ($Li_2S_2$ and/or $Li_2S$), causing active mass loss. In addition, the solid product that precipitates on the surface of the positive electrode during discharge can become electrochemically irreversible, which also contributes to active mass loss.
  (3) More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications. Despite the various approaches proposed for the fabrication of high energy density rechargeable cells containing elemental sulfur, organo-sulfur and carbon-sulfur cathode materials, or derivatives and combinations thereof, there remains a need for materials and cell designs that (a) retard the out-diffusion of anionic reduction products, from the cathode compartments into other components in these cells, (b) improve the battery safety, and (c) provide rechargeable cells with high capacities over a large number of cycles.

Again, lithium metal (including pure lithium, alloys of lithium with other metal elements, or lithium-containing compounds) still provides the highest anode specific capacity as compared to essentially all other anode active materials. Lithium metal would be an ideal anode material in a lithium secondary battery if the challenge of implementing lithium metal in the anode during cell manufacturing and dendrite related issues, such as fire and explosion danger, could be addressed.

SUMMARY

Hence, a general object of the present disclosure is to provide a safe, non-flammable, quasi-electrolyte electrolyte system for a rechargeable lithium cell that is compatible with existing battery production facilities. The electrolyte must be sufficiently high in lithium salt concentration to ensure non-flammability and yet also maintain adequate flowability (fluidity) to enable injection of liquid electrolyte into dry battery cells. These two appear to be mutually conflicting requirements.

A specific object of the present disclosure is to provide a rechargeable lithium metal battery that does not contain lithium metal in the anode initially when the cell is manufactured. Such an anode-less cell would not involve implementation of lithium metal (highly sensitive to air moisture and oxygen) during the cell making stage. In addition, the battery must also exhibit a high energy density, high power density, long cycle life, and no danger of explosion.

As a first embodiment, the present disclosure provides a rechargeable lithium battery, including a lithium metal secondary cell, a lithium-ion cell, a lithium-sulfur cell, a lithium-ion sulfur cell, a lithium-selenium cell, or a lithium-air cell. This battery features a non-flammable, safe, and high-performing electrolyte.

In certain embodiments, the rechargeable lithium cell comprises: (a) a cathode having a cathode active material and a first electrolyte in ionic contact with the cathode active material; (b) an anode having an anode current collector but no anode active material (no conventional anode active material such as graphite, Si, SiO, and Sn) and having no lithium metal when the cell is made (there is no lithium metal before the cell begins to charge and discharge and no anode active materials, hence the name "anode-less" cell); (c) an optional porous separator electronically separating the anode and the cathode; and (d) a second electrolyte, comprising a polymer electrolyte in ionic contact with the first electrolyte, wherein the polymer electrolyte is disposed substantially between the anode and the cathode, between the separator and the cathode, and/or between the separator and the anode. Preferably and typically, the anode and/or the cathode are substantially free of the second electrolyte composition.

In certain embodiments, the first electrolyte contains a solution comprising a lithium salt dissolved in a liquid solvent, having a lithium salt concentration C1 from 1.5 M to 14.0 M so that the electrolyte exhibits a vapor pressure less than 0.01 kPa when measured at 20° C., a vapor pressure less than 60% of the vapor pressure of said liquid solvent alone, a flash point at least 20 degrees Celsius higher than a flash point of the liquid solvent alone, a flash point higher than 150° C., or no detectable flash point.

The first electrolyte may be selected from a liquid electrolyte, an ionic liquid electrolyte, a polymer electrolyte, a polymer gel electrolyte, an inorganic solid electrolyte, a catholyte, or a combination thereof.

In some embodiments, the first electrolyte comprises a flame-retardant additive that is different in composition than the liquid solvent and is selected from Hydrofluoro ether (FIFE), Trifluoro propylene carbonate (FPC), Methyl nonafluorobutyl ether (MFE), Fluoroethylene carbonate (FEC), Tris(trimethylsilyl) phosphite (TTSPi), Triallyl phosphate (TAP), Ethylene sulfate (DTD), 1,3-propane sultone (PS), Propene sultone (PES), Alkylsiloxane (Si—O), Alkylsilane (Si—C), liquid oligomeric silaxane (—Si—O—Si—), tetraethylene glycol dimethylether (TEGDME), canola oil, or a combination thereof and the additive-to-said liquid solvent ratio in said mixture is from 5/95 to 95/5 by weight.

The additive-to-liquid solvent ratio in the mixture is from 5/95 to 95/5 by weight, preferably from 15/85 to 85/15 by weight, further preferably from 25/75 to 75/25 by weight, and most preferably from 35/65 to 65/35 by weight.

In certain embodiments, the lithium salt concentration is from 1.75 M to 7.0 M. In certain preferred embodiments, the concentration is from 2.0 M to 5.0 M.

The polymer electrolyte preferably comprises a polymer selected from poly(ethylene oxide) (PEO), polypropylene oxide (PPO), poly(ethylene glycol) (PEG), poly(acrylonitrile) (PAN), poly(methyl methacrylate) (PMMA), poly(vinylidene fluoride) (PVdF), Poly bis-methoxy ethoxyethoxide-phosphazenex, polyvinyl chloride, polydimethylsiloxane, poly(vinylidene fluoride)-hexafluoropropylene (PVDF-HFP), cyanoethyl poly(vinyl alcohol) (PVACN), a pentaerythritol tetraacrylate (PETEA)-based polymer, an aliphatic polycarbonate (including poly(vinylene carbonate) (PVC), poly(ethylene carbonate) (PEC), poly(propylene carbonate) (PPC), and poly(trimethylene carbonate) (PTMC)), a single Li-ion conducting solid polymer electrolyte with a carboxylate anion, a sulfonylimide anion, or sulfonate anion, a crosslinked electrolyte of poly (ethylene glycol) diacrylate (PEGDA) or poly(ethylene glycol) methyl ether acrylate, a sulfonated derivative thereof, or a combination thereof.

The polymer electrolyte composition preferably contains a polymer that can be cured or cross-linked. This polymer may be initially in a monomer or oligomer state that remains as a liquid which can be injected into the battery cell and then cured or crosslinked after being injected into the cell. Examples include cyanoethyl poly(vinyl alcohol) (PVACN), a pentaerythritol tetraacrylate (PETEA)-based polymer, poly (vinylene carbonate) (PVC), poly(ethylene carbonate) (PEC), poly(propylene carbonate) (PPC), and poly(trimethylene carbonate) (PTMC).

In certain embodiments, the present disclosure provides a rechargeable lithium cell (an anode-less lithium metal cell), comprising: (a) a cathode having a cathode active material; (b) an anode having an anode current collector, but no anode active material, and having no lithium metal when the cell is made; (c) an optional porous separator electronically separating the anode and the cathode; and (d) an electrolyte, comprising a polymer electrolyte in ionic contact with the anode and the cathode, wherein the polymer electrolyte comprises a polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

This polymer electrolyte preferably contains a polymer that can be cured or cross-linked. This polymer may be initially in a monomer or oligomer state that remains as a liquid which can be injected into the battery cell and then cured or crosslinked after being injected into the cell. Examples include cyanoethyl poly(vinyl alcohol) (PVACN), a pentaerythritol tetraacrylate (PETEA)-based polymer, poly (vinylene carbonate) (PVC), poly(ethylene carbonate) (PEC), poly(propylene carbonate) (PPC), and poly(trimethylene carbonate) (PTMC).

We have surprisingly discovered that, for the first electrolyte composition, the flammability of any organic solvent can be effectively suppressed provided that a sufficiently high amount of a lithium salt (from 1.5 M to 14.0 M or higher) is added to and dissolved in the mixture of a liquid solvent and a liquid additive (selected from the above list) to form a solid-like or quasi-solid electrolyte. We have further surprising observed that the required salt amount (concentration) can be significantly reduced (e.g. from 5 M to below 3 M, or from 3.5 M to below 2.5 M or even below 2.0 M) if a sufficient amount of at least one of the flame retardant additives given in the above list is added to the liquid solvent to form a mixture. The presence of such a flame retardant additive unexpectedly enables us to achieve both non-flammability and adequate flowability of a liquid electrolyte, the two requirements that would have been considered mutually exclusive.

The first electrolyte composition is designed to permeate into the internal structure of the cathode to become in physical contact or ionic contact with the cathode active material in the cathode.

In general, such a quasi-solid electrolyte exhibits a vapor pressure less than 0.01 kPa (when measured at 20° C.) and less than 0.1 kPa (when measured at 100° C.). In many cases, the vapor molecules are practically too few to be detected. The high solubility of the lithium salt in an otherwise highly volatile solvent has effectively prevented the flammable gas molecules from initiating a flame even at an extremely high temperature (e.g. using a torch, as demonstrated in FIG. 1(A) and FIG. 1(B)). The flash point of the quasi-solid electrolyte is typically at least 20 degrees (often >50 degrees) higher than the flash point of the same neat organic solvent alone. In most of the cases, either the flash point is higher than 150° C. or no flash point can be detected. The electrolyte just would not catch on fire or get ignited. Any accidentally initiated flame does not sustain for longer than a few seconds. This is a highly significant discovery, considering the notion that fire and explosion concern has been a major impediment to widespread acceptance of battery-powered electric vehicles. This new technology could potentially reshape the landscape of EV industry.

Another surprising element of the present disclosure is the notion that we are able to dissolve a high concentration of a lithium salt in an organic solvent to form an electrolyte suitable for use in a rechargeable lithium battery. This concentration is typically greater than a lithium salt molecular ratio (molecular fraction) of approximately >0.12 (corresponding to approximately >1.5 M or 1.5 mole/liter), more typically >0.15 (approximately >1.9 M), can be >0.2 (>2.5 M), >0.3 (>3.75 M) and even >0.4 (>5 M). The equivalency between molecular fraction figure and molar concentration figure (mole/liter) varies from one salt/solvent combination to another.

In the instant disclosure, with an electrolyte additive selected and added, the concentration is typically and preferably from 1.5 M to 5.0 M, still more typically and preferably from 2.0 M to 3.5M, and most preferably from 2.5 M to 3.0 M. Such a high concentration of lithium salt in a solvent has not been generally considered possible or desirable. Indeed, in general, it has not been possible to achieve concentration of lithium salt in an organic solvent higher than 3.5 M and, in general, 1 M is a standard concentration in lithium-ion battery.

After an extensive and in-depth study, we came to further discover that the apparent solubility of a lithium salt (e.g., in the first electrolyte composition) can be significantly increased if (a) initially a highly volatile co-solvent is used to increase the amount of lithium salt dissolved in the solvent mixture first and then (b) this volatile co-solvent is partially or totally removed once the dissolution procedure is completed. Quite unexpectedly, the removal of this co-solvent typically did not lead to precipitation or crystallization of the lithium salt out of the solution even though the solution would have been in a highly supersaturated state. This novel and unique approach appears to have produced a material state wherein most of the solvent molecules are retained or captured by lithium salt ions that are not volatile. Hence, very few solvent molecules are able to escape into the vapor phase. Consequently, very few volatile gas molecules can be present to initiate or sustain a flame. This has not been suggested as technically possible or viable in any previous report.

It may be noted that a good scientist in the field of chemistry or materials science would anticipate that such a high salt concentration would make the electrolyte behave like a solid with an extremely high viscosity and, hence, this electrolyte would not be amenable to fast diffusion of lithium ions therein. Consequently, the scientist would tend to expect that a lithium battery containing such a solid-like electrolyte would not and could not exhibit a high capacity at a high charge-discharge rate or under a high current density condition (i.e. the battery should have a poor rate capability). Contrary to these expectations, all the lithium cells containing such a quasi-solid electrolyte deliver surprisingly high energy density and high power density for a long cycle life. The quasi-solid electrolytes as herein disclosed are conducive to facile lithium ion transport. This surprising observation is manifested by a high lithium ion transference number (TN), to be further explained in a later section of this specification. We have found that the quasi-solid electrolytes provide a TN greater than 0.4 (typically in the range from 0.4-0.8), in contrast to the typical values of 0.1-0.2 in all lower concentration electrolytes (e.g. <1.5 M) used in all current Li-ion and Li—S cells.

The first electrolyte composition of the disclosed rechargeable lithium cell preferably contains a quasi-solid electrolyte having a lithium ion transference number greater than 0.4, preferably and typically greater than 0.6, and most preferably and typically greater than 0.7. It may be noted that the lithium ion transference number of an electrolyte (given the same type and concentration of lithium salt in the same solvent) can vary from a battery type to another; e.g. from a lithium metal cell (where the anode is Li metal) to a lithium-ion cell (where the anode is Sn). The total amount of lithium available for moving back and forth between the anode and the cathode is an important factor that can dictate this transference number.

In any of the aforementioned rechargeable lithium cell (e.g. a lithium metal secondary cell or a lithium-ion cell), the first organic liquid solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, a combination thereof, or a combination with a room temperature ionic liquid solvent.

The lithium salt is preferably selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), lithium bis(trifluoromethanesulphonyl)imide, lithium bis(fluorosulphonyl)imide, an ionic liquid-based lithium salt, a combination thereof, or a combination thereof with lithium trifluoromethanes-ulfonimide (LiTFSI).

The polymer electrolyte in the second electrolyte composition is designed to further reduce the flammability of the battery cell. In the presently disclosed lithium secondary cell, typically and preferably the first electrolyte is incorporated into the battery cell first. This can be conducted by incorporating the first electrolyte into the cathode before the cathode and the anode, along with the porous separator or ion-permeable membrane, are assembled into a cell. Alternatively, the anode, the cathode, and the porous separator (or ion-permeable membrane) are assembled into a dry cell, which is then injected with the first electrolyte composition. The first electrolyte does not fully occupy the internal space of the dry cell, leaving some room to accommodate the second electrolyte composition. Once an adequate amount of time is allowed for permeation of the first electrolyte to reach the cathode active materials in the cathode, one may then introduce the second electrolyte composition into the cell. Since the internal structures of the cathode have been substantially loaded with the first electrolyte, the second electrolyte tends to stay near the separator or a space between the anode and the cathode.

As indicated earlier, the polymer electrolyte may be initially in a monomer or oligomer state that remains as a liquid which is capable of being injected and flowed into the battery cell and then cured or crosslinked after being injected into the cell. The polymer electrolyte typically will not permeate into the interior of the cathode.

There are no particular restrictions on the types of cathode active materials that can be used in the presently disclosed lithium battery, which can be a primary battery or a secondary battery.

In a preferred rechargeable lithium cell, the cathode active material may be selected from a metal oxide, a metal oxide-free inorganic material, an organic material, a polymeric material, sulfur, lithium polysulfide, selenium, or a combination thereof. The metal oxide-free inorganic material may be selected from a transition metal fluoride, a transition metal chloride, a transition metal dichalcogenide, a transition metal trichalcogenide, or a combination thereof. In a particularly useful embodiment, the cathode active material is selected from $FeF_3$, $FeCl_3$, $CuCl_2$, $TiS_2$, $TaS_2$, $MoS_2$, $NbSe_3$, $MnO_2$, $CoO_2$, an iron oxide, a vanadium oxide, or a combination thereof, if the anode contains lithium metal as the anode active material. The vanadium oxide may be preferably selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. For those cathode active materials containing no Li element therein, there must be a lithium source implemented in the cathode side to begin with. This can be any compound that contains a high lithium content, or a lithium metal alloy, etc.

In a rechargeable lithium cell (e.g., the lithium-ion battery cell), the cathode active material may be selected to contain a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In a preferred lithium metal secondary cell, the cathode active material preferably contains an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof. Again, for those cathode active materials containing no Li element therein, there must be a lithium source implemented in the cathode side to begin with.

In another preferred rechargeable lithium cell (e.g. a lithium metal secondary cell or a lithium-ion cell), the cathode active material contains an organic material or polymeric material selected from Poly(anthraquinonyl sulfide) (PAQS), lithium oxocarbons (including squarate, croconate, and rhodizonate lithium salts), oxacarbon (including quinines, acid anhydride, and nitrocompound), 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material (redox-active structures based on multiple adjacent carbonyl groups (e.g., "$C_6O_6$"-type structure, oxocarbons), Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS_2)_3]n), lithiated 1,4,5,8-naphthalenetetraol formaldehyde polymer, Hexaazatrinaphtylene (HATN), Hexaazatriphenylene hexacarbonitrile (HAT(CN)6), 5-Benzylidene hydantoin, Isatine lithium salt, Pyromellitic diimide lithium salt, tetrahydroxy-p-benzoquinone derivatives (THQLi_4), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer may be selected from Poly[methanetetryl-tetra(thiomethylene)] (PMTTM), Poly(2,4-dithiopentanylene) (PDTP), or Poly(ethene-1,1,2,2-tetrathiol) (PETT) as a main-chain thioether polymer, in which sulfur atoms link carbon atoms to form a polymeric backbones. The side-chain thioether polymers have polymeric main-chains that consist of conjugating aromatic moieties, but having thioether side chains as pendants. Among them Poly(2-phenyl-1,3-dithiolane) (PPDT), Poly(1,4-di(1,3-dithiolan-2-yl)benzene) (PDDTB), poly(tetrahydrobenzodithiophene) (PTHBDT), and poly[1,2,4,5-tetrakis(propylthio)benzene] (PTKPTB) have a polyphenylene main chain, linking thiolane on benzene moieties as pendants. Similarly, poly[3,4(ethylenedithio)thiophene] (PEDTT) has polythiophene backbone, linking cyclo-thiolane on the 3,4-position of the thiophene ring.

In yet another preferred rechargeable lithium cell, the cathode active material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. This class of lithium secondary batteries has a high capacity and high energy density. Again, for those cathode active materials containing no Li element therein, there must be a lithium source implemented in the cathode side to begin with.

Still another preferred embodiment of the present disclosure is a rechargeable lithium-sulfur cell or lithium-ion sulfur cell containing a sulfur cathode having sulfur or lithium polysulfide as a cathode active material.

In an embodiment, the first or the second electrolyte composition may contain an ionic liquid solvent. The ionic liquid solvent is preferably selected from a room temperature ionic liquid having a cation selected from tetraalkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof. The room temperature ionic liquid preferably has an anion selected from $BF_4^-$, $B(CN)_4^-$, $CH_3BF_3^-$, $CH_2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

Another preferred rechargeable lithium cell is a lithium-air cell having a higher round-trip efficiency or higher resistance to capacity decay as compared to a corresponding lithium-air cell that has an electrolyte salt concentration x (molecular ratio) lower than 0.2.

The rechargeable lithium cell may further comprise a layer of protective material disposed between the anode current collector and the separator or the polymer electrolyte wherein the protective material is a lithium ion conductor.

The anode current collector may comprise a foil, perforated sheet, or foam of a metal having two primary surfaces wherein at least one primary surface is coated with or protected by a layer of lithiophilic metal (a metal capable of forming a metal-Li solid solution or is wettable by lithium ions), a layer of graphene material, or both. The metal foil, perforated sheet, or foam is preferably selected from Cu, Ni, stainless steel, Al, graphene-coated metal, graphite-coated metal, carbon-coated metal, or a combination thereof.

The lithiophilic metal is preferably selected from Au, Ag, Mg, Zn, Ti, K, Al, Fe, Mn, Co, Ni, Sn, V, Cr, an alloy thereof, or a combination thereof.

The graphene layer preferably comprises graphene sheets selected from single-layer or few-layer graphene, wherein said few-layer graphene sheets have 2-10 layers of stacked graphene planes having an inter-plane spacing $d_{002}$ from 0.3354 nm to 0.6 nm as measured by X-ray diffraction and said single-layer or few-layer graphene sheets contain a pristine graphene material having essentially zero % of non-carbon elements, or a non-pristine graphene material having 0.001% to 45% by weight of non-carbon elements. The non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The graphene layer may comprise porous graphene balls or graphene foam.

In certain embodiments, the separator comprises polymeric fibers, ceramic fibers, glass fibers, or a combination thereof. These fibers may be stacked together in such a manner that there are pores that allow for permeation of lithium ions, but not for penetration of any potentially formed lithium dendrites. These fibers may be dispersed in a matrix material or bonded by a binder material. This matrix or binder material may contain a ceramic or glass material. The polymer electrolyte may serve as the matrix material or binder material that helps to hold these fibers together. The separator may contain particles of a glass or ceramic material (e.g. metal oxide, metal carbide, metal nitride, metal boride, etc.).

The rechargeable lithium cell may further comprise a cathode current collector selected from aluminum foil, carbon- or graphene-coated aluminum foil, stainless steel foil or web, carbon- or graphene-coated steel foil or web, carbon or graphite paper, carbon or graphite fiber fabric, flexible graphite foil, graphene paper or film, or a combination thereof. A web means a screen-like structure or a metal foam, preferably having interconnected pores or through-thickness apertures.

The presently disclosed lithium cell is not limited to lithium metal-sulfur cell or lithium-ion cell. This safe and high-performing hybrid electrolyte can be used in any lithium metal secondary cell (lithium metal-based anode coupled with any cathode active material) and any lithium-ion cell.

The disclosure also provides a method of producing the disclosed rechargeable lithium cell, the method comprising:
(A) preparing a lithium cell comprising (i) a cathode having a cathode active material and a first electrolyte in ionic contact with the cathode active material, (ii) an anode having an anode current collector but no anode active material and having no lithium metal when the cell is made, (iii) an optional porous separator or ion-permeable membrane electronically separating the anode and cathode, and (iv) a protecting housing that substantially encloses the cathode, the anode, the optional separator, wherein the lithium cell has an unfilled space; and
(B) introducing a second electrolyte into the unfilled space, wherein the second electrolyte comprises a polymer electrolyte in ionic contact with the first electrolyte and being disposed between the anode and the cathode, between the separator and the cathode, and/or between the separator and the anode.

In certain embodiments, step (A) comprises either a procedure of introducing the first electrolyte in the cathode when the cathode is made and before the cathode is enclosed in the protective housing or a procedure of introducing the first electrolyte in the cathode after the cathode, the anode, and the separator are enclosed in the protective housing.

The first electrolyte may comprise a solution comprising a lithium salt dissolved in a liquid solvent having a salt concentration from 1.5 M to 14.0 M.

The first electrolyte may further comprise a flame-retardant additive that is different in composition than said liquid solvent and is selected from Hydrofluoro ether (FIFE), Trifluoro propylene carbonate (FPC), Methyl nonafluorobutyl ether (MFE), Fluoroethylene carbonate (FEC), Tris (trimethylsilyl)phosphite (TTSPi), Triallyl phosphate (TAP), Ethylene sulfate (DTD), 1,3-propane sultone (PS), Propene sultone (PES), Alkylsiloxane (Si—O), Alkylsilane (Si—C), liquid oligomeric silaxane (—Si—O—Si—), Tetraethylene glycol dimethylether (TEGDME), canola oil, or a combination thereof and said additive-to-said liquid solvent ratio in said mixture is from 5/95 to 95/5 by weight.

The polymer electrolyte preferably comprises a polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

In some embodiments, step (B) comprises a procedure of introducing a precursor monomer, oligomer, or un-cured version of the polymer electrolyte into the unfilled space and then polymerizing and/or curing the precursor inside the battery cell to form the polymer electrolyte.

In some embodiments, step (A) comprises a procedure (i) of assembling the anode, the cathode, and the separator or membrane, along with a cell housing together to form a dry battery cell having initially no electrolyte therein and a procedure (ii) of introducing a first electrolyte into the dry cell, enabling the first electrolyte to permeate into the cathode; and wherein step (B) is conducted after procedure (ii).

The method may further comprise, before step (B), a procedure of removing a desired portion of a liquid solvent from said battery cell to create additional unfilled space.

These and other advantages and features of the present disclosure will become more transparent with the description of the following best mode practice and illustrative examples.

BRIEF DESCRIPTION OF THE DRAWINGS

FIG. 2(A) Structure of an anode-less lithium metal cell (as manufactured or in a discharged state) according to some embodiments of the present disclosure;

FIG. 2(B) Structure of an anode-less lithium metal cell (in a charged state) according to some embodiments of the present disclosure.

DETAILED DESCRIPTION OF PREFERRED EMBODIMENTS

Figure 1A:
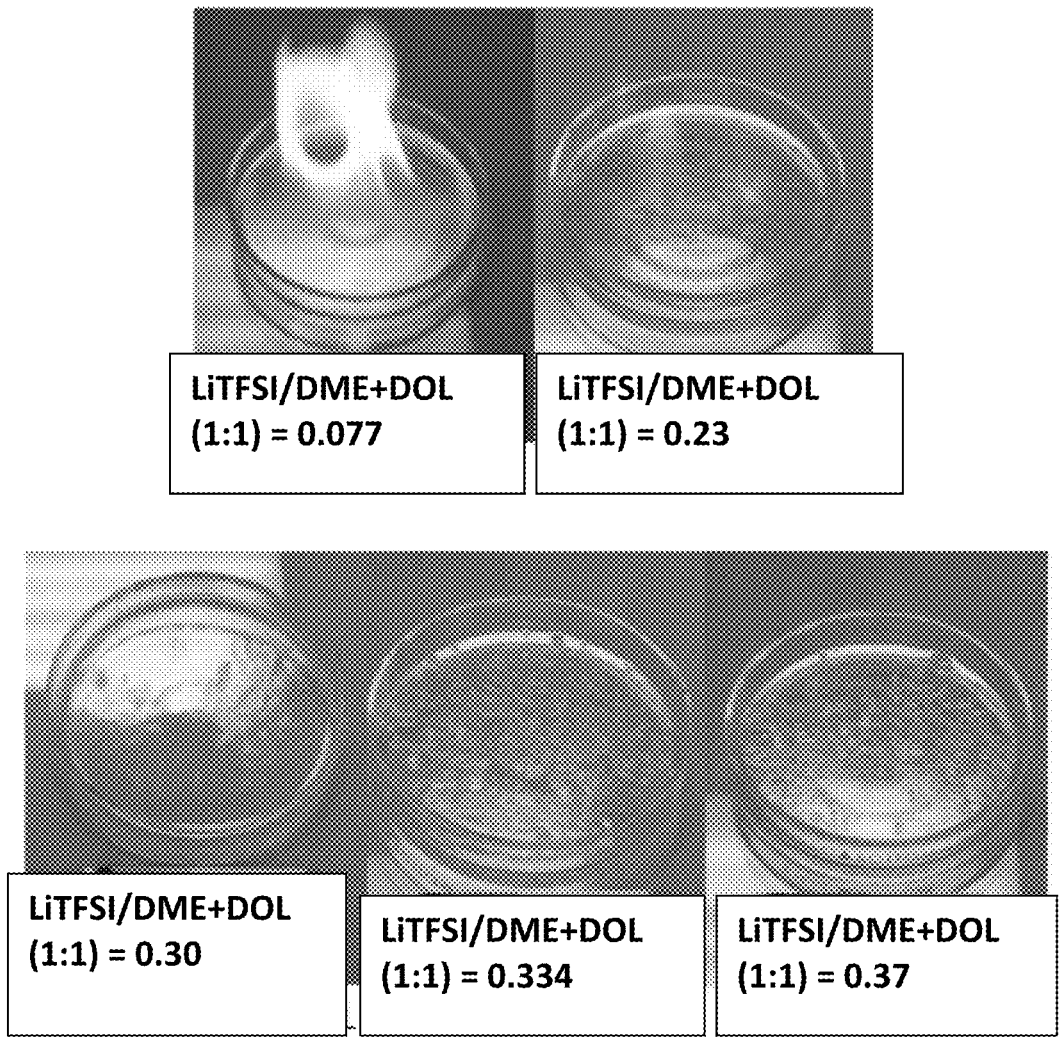
FIG. 1(A) Photos showing the results of a flammability test conducted for various electrolytes with different lithium salt concentrations (intended to serve as a first electrolyte of the presently disclosed lithium cell)

The present disclosure provides a safe and high-performing lithium battery, which can be any of various types of lithium-ion cells or lithium metal cells. A high degree of safety is imparted to this battery by a novel and unique electrolyte that is essentially non-flammable and would not initiate a fire or sustain a fire and, hence, would not pose explosion danger. This disclosure has solved the very most critical issue that has plagued the lithium-metal and lithium-ion industries for more than two decades.

As indicated earlier in the Background section, a strong need exists for a safe, non-flammable, yet injectable quasi-electrolyte electrolyte system for a rechargeable lithium cell that is compatible with existing battery production facilities. The electrolyte must be sufficiently high in lithium salt concentration to ensure non-flammability and yet also maintain adequate flowability (fluidity) to enable that the electrolyte can be introduced into dry battery cells. The present disclosure has solved this problem of having two conflicting requirements that appear to be mutually exclusive.

In certain embodiments, the rechargeable lithium cell comprises: (a) a cathode having a cathode active material and a first electrolyte in ionic contact with the cathode active material; (b) an anode having an anode current collector but no anode active material (no conventional anode active material such as graphite, Si, SiO, Sn, and conversion-type anode materials) and having no lithium metal when the cell is made (there is no lithium metal or anode active material before the cell begins to charge and discharge, hence the name "anode-less" cell); (c) an optional porous separator electronically separating the anode and the cathode; and (d) a second electrolyte, comprising a polymer electrolyte in ionic contact with the first electrolyte, wherein the polymer electrolyte is disposed substantially between the anode and the cathode, between the separator and the cathode, and/or between the separator and the anode. Preferably and typically, the anode and/or the cathode are substantially free of the second electrolyte composition.

As illustrated in FIG. 2(A), the anode-less lithium cell is in an as-manufactured or fully discharged state according to certain embodiments of the present disclosure. The cell comprises an anode current collector 12 (e.g. Cu foil), a second electrolyte 14 shown to be on two surfaces of a separator 15 (can be just one layer on the anode or the cathode side of the separator), a cathode layer 16 comprising a cathode active material and an electrolyte (first electrolyte), and a cathode current collector 18 that supports the cathode layer 16. There is no lithium metal in the anode side when the cell is manufactured.

In a charged state, as illustrated in FIG. 2(B), the cell comprises an anode current collector 12, lithium metal 20 plated on a surface (or two surfaces) of the anode current collector 12 (e.g. Cu foil), second electrolyte 14 shown to be on two surfaces of a separator 15, a cathode layer 16 comprising a cathode active material and an electrolyte (first electrolyte), and a cathode current collector 18 supporting the cathode layer. The lithium metal comes from the cathode active material (e.g. $LiCoO_2$ and $LiMn_2O_4$) that contains Li element when the cathode is made. During a charging step, lithium ions are released from the cathode active material and move to the anode side to deposit onto a surface or both surfaces of an anode current collector.

Figure 2C:
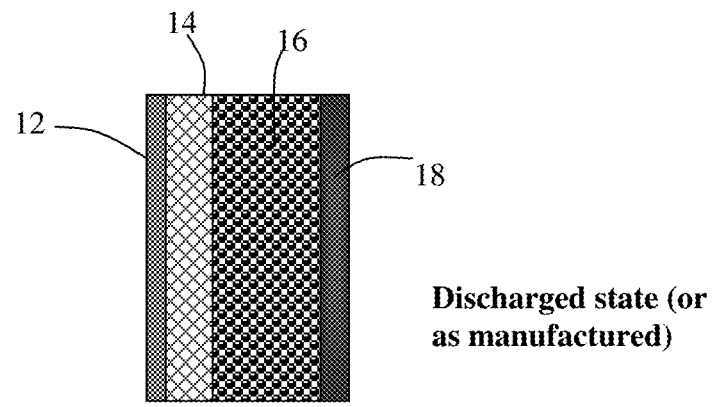
FIG. 2(C) Structure of an anode-less lithium metal cell (as manufactured or in a discharged state) according to some embodiments of the present disclosure.
Figure 2D:
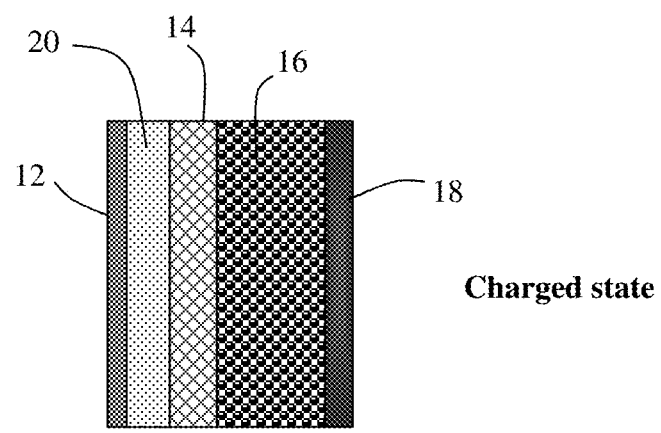
FIG. 2(D) Structure of an anode-less lithium metal cell (in a charged state) according to some embodiments of the present disclosure.

FIG. 2(C) shows the anode-less lithium cell is in an as-manufactured or fully discharged state according to another certain embodiment of the present disclosure. FIG. 2(D) shows a charged state of a cell of the present disclosure. FIG. 2(C) and FIG. 2(D) do not have a separator.

In certain embodiments, the first electrolyte contains a solution comprising a lithium salt dissolved in a liquid solvent, having a lithium salt concentration C1 from 1.5 M to 14.0 M so that the electrolyte exhibits a vapor pressure less than 0.01 kPa when measured at 20° C., a vapor pressure less than 60% of the vapor pressure of said liquid solvent alone, a flash point at least 20 degrees Celsius higher than a flash point of the liquid solvent alone, a flash point higher than 150° C., or no detectable flash point.

The first electrolyte may be selected from a liquid electrolyte, an ionic liquid electrolyte, a polymer electrolyte, a polymer gel electrolyte, an inorganic solid electrolyte, a catholyte, or a combination thereof.

In some embodiments, the first electrolyte and/or the second electrolyte comprises a flame-retardant additive that is different in composition than the liquid solvent and is selected from Hydrofluoro ether (FIFE), Trifluoro propylene carbonate (FPC), Methyl nonafluorobutyl ether (MFE), Fluoroethylene carbonate (FEC), Tris(trimethylsilyl) phosphite (TTSPi), Triallyl phosphate (TAP), Ethylene sulfate (DTD), 1,3-propane sultone (PS), Propene sultone (PES), Alkylsiloxane (Si—O), Alkylsilane (Si—C), liquid oligomeric silaxane (—Si—O—Si—), tetraethylene glycol dimethylether (TEGDME), canola oil, or a combination thereof and the additive-to-said liquid solvent ratio in said mixture is from 5/95 to 95/5 by weight.

One unique feature of the presently disclosed lithium cell is the notion that there is substantially no anode active material and no lithium metal is present when the battery cell is made. The commonly used anode active material, such as an intercalation type anode material (e.g. graphite, carbon particles, Si, SiO, Sn, $SnO_2$, Ge, etc.), P, or any conversion-type anode material, is not included in the cell. The anode only contains a current collector or a protected current collector. No lithium metal (e.g. Li particle, surface-stabilized Li particle, Li foil, Li chip, etc.) is present in the anode when the cell is made; lithium is basically stored in the cathode (e.g. Li element in $LiCoO_2$, $LiMn_2O_4$, lithium iron phosphate, lithium polysulfides, lithium polyselenides, etc.). During the first charge procedure after the cell is sealed in a housing (e.g. a stainless steel hollow cylinder or an Al/plastic laminated envelop), lithium ions are released from these Li-containing compounds (cathode active materials) in the cathode, travel through the electrolyte/separator into the anode side, and get deposited on the surfaces of an anode current collector. During a subsequent discharge procedure, lithium ions leave these surfaces and travel back to the cathode, intercalating or inserting into the cathode active material.

Such an anode-less cell is much simpler and more cost-effective to produce since there is no need to have a layer of anode active material (e.g. graphite particles, along with a conductive additive and a binder) pre-coated on the Cu foil surfaces via the conventional slurry coating and drying procedures. The anode materials and anode active layer manufacturing costs can be saved. Furthermore, since there is no anode active material layer (otherwise typically 40-200 μm thick), the weight and volume of the cell can be significantly reduced, thereby increasing the gravimetric and volumetric energy density of the cell.

Another important advantage of the anode-less cell is the notion that there is no lithium metal in the anode when a lithium metal cell is made. Lithium metal (e.g. Li metal foil and particles) is highly sensitive to air moisture and oxygen and notoriously known for its difficulty and danger to handle during manufacturing of a Li metal cell. The manufacturing facilities must be equipped with special class of dry rooms, which are expensive and significantly increase the battery cell costs.

The anode current collector may be selected from a foil, perforated sheet, or foam of Cu, Ni, stainless steel, Al, graphene, graphite, graphene-coated metal, graphite-coated metal, carbon-coated metal, or a combination thereof. Preferably, the current collector is a Cu foil, Ni foil, stainless steel foil, graphene-coated Al foil, graphite-coated Al foil, or carbon-coated Al foil.

The anode current collector typically has two primary surfaces. Preferably, one or both of these primary surfaces is deposited with multiple particles or coating of a lithium-attracting metal (lithiophilic metal), wherein the lithium-attracting metal, preferably having a diameter or thickness from 1 nm to 10 μm, is selected from Au, Ag, Mg, Zn, Ti, K, Al, Fe, Mn, Co, Ni, Sn, V, Cr, an alloy thereof, or a combination thereof. This deposited metal layer may be further deposited with a layer of graphene that covers and protects the multiple particles or coating of the lithiophilic metal.

The graphene layer may comprise graphene sheets selected from single-layer or few-layer graphene, wherein the few-layer graphene sheets are commonly defined to have 2-10 layers of stacked graphene planes having an inter-plane spacing $d_{002}$ from 0.3354 nm to 0.6 nm as measured by X-ray diffraction. The single-layer or few-layer graphene sheets may contain a pristine graphene material having essentially zero % of non-carbon elements, or a non-pristine graphene material having 0.001% to 45% by weight of non-carbon elements. The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The graphene layer may comprise graphene balls and/or graphene foam. Preferably, the graphene layer has a thickness from 1 nm to 50 μm and/or has a specific surface area from 5 to 1000 $m^2/g$ (more preferably from 10 to 500 $m^2/g$).

Another surprising and of tremendous scientific and technological significance is our discovery that the flammability of any volatile organic solvent can be effectively suppressed provided that a sufficiently high amount of a lithium salt and polymer is added to and dissolved in this organic solvent to form a solid-like or quasi-solid electrolyte (e.g. first electrolyte in the cathode). In general, such a quasi-solid electrolyte exhibits a vapor pressure less than 0.01 kPa and often less than 0.001 kPa (when measured at 20° C.) and less than 0.1 kPa and often less than 0.01 kPa (when measured at 100° C.). (The vapor pressures of the corresponding neat solvent, without any lithium salt dissolved therein, are typically significantly higher.) In many cases, the vapor molecules are practically too few to be detected.

A highly significant observation is that the high concentration of the lithium salt dissolved in an otherwise highly volatile solvent (a large molecular ratio or molar fraction of lithium salt, typically >0.2, more typically >0.3, and often >0.4 or even >0.5) can dramatically curtail the amount of volatile solvent molecules that can escape into the vapor phase in a thermodynamic equilibrium condition. In many cases, this has effectively prevented the flammable gas molecules from initiating a flame even at an extremely high temperature (e.g. using a torch, as demonstrated in FIG. 1(A) and FIG. 1(B)). The flash point of the quasi-solid electrolyte is typically at least 20 degrees (often >50 degrees) higher than the flash point of the neat organic solvent alone. In most of the cases, either the flash point is higher than 150° C. or no flash point can be detected. The electrolyte just would not catch on fire. Furthermore, any accidentally initiated flame does not sustain for longer than 3 seconds. This is a highly significant discovery, considering the notion that fire and explosion concern has been a major impediment to widespread acceptance of battery-powered electric vehicles. This new technology could significantly impact the emergence of a vibrant EV industry.

Figure 1B:
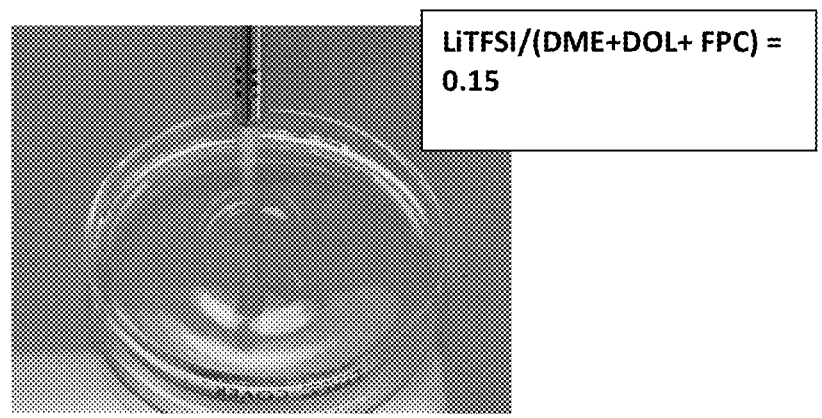
FIG. 1(B) Photo showing the result of a flammability test for a lower concentration electrolyte but having an additive, 30% FPC; LiTFSI/(DME+DOL+FPC)=0.16 or approximately 2.0 M (intended to serve as a first electrolyte of the presently disclosed lithium cell).

In the no flash point conditions of the present application, such as those demonstrated in FIG. 1(A) and FIG. 1(B), contacting the electrolyte with a butane torch does not trigger an ignition that would occur at a flash point. The flame of a butane torch is known to burn at temperatures above 1,400° C. The flame used in no flash point conditions is estimated to have a temperature of 1,400° C.

However, an excessively high salt concentration could result in an excessively high electrolyte viscosity. When the lithium salt concentration exceeds approximately 3.5 M (molecular ratio or fraction>0.28), it becomes very difficult to inject the electrolyte into a well-packed dry cell to finish the cell production procedure. The injection becomes totally impossible when the salt concentration exceeds 5.0 M (molecular fraction>0.4). This has prompted us to search for solutions to this problem of having two mutually exclusive requirements (high salt concentration for non-flammability and low salt concentration for electrolyte fluidity). After extensive and in-depth studies, we have come to discover that these conflicting issues can be resolved provided certain liquid additives are added to the liquid solvent to form a mixture in which the lithium salt is dissolved to form the electrolyte. There can be one liquid solvent with one liquid additive, one liquid solvent with two liquid additives, two liquid solvents with one liquid additive, etc. in the liquid mixture. There can be multiple liquid solvents mixed with multiple liquid additives.

FIG. 1(B) is a photo showing the result of a flammability test for a lower concentration electrolyte but having an additive (30% FPC), which is a flame retardant. The electrolyte composition has a molecular ratio of LiTFSI/(DME+DOL+FPC)=0.16 or approximately 2.0 M. Even though this is a relatively low concentration among the group of quasi-solid electrolytes, this electrolyte is non-flammable when a torch was brought to be in touch with the electrolyte. This electrolyte has a relatively low viscosity, having sufficient flowability to enable electrolyte injection during battery manufacturing. Injection of electrolyte becomes more difficult when the salt concentration exceeds 3 M and becomes practically non-feasible when the salt concentration exceeds 5 M.

The polymer electrolyte preferably comprises a polymer selected from poly(ethylene oxide) (PEO), polypropylene oxide (PPO), poly(ethylene glycol) (PEG), poly(acrylonitrile) (PAN), poly(methyl methacrylate) (PMMA), poly(vinylidene fluoride) (PVdF), Poly bis-methoxy ethoxyethoxide-phosphazenex, polyvinyl chloride, polydimethylsiloxane, poly(vinylidene fluoride)-hexafluoropropylene (PVDF-HFP), cyanoethyl poly(vinyl alcohol) (PVACN), a pentaerythritol tetraacrylate (PETEA)-based polymer, an aliphatic polycarbonate (including poly(vinylene carbonate) (PVC), poly(ethylene carbonate) (PEC), poly(propylene carbonate) (PPC), and poly(trimethylene carbonate) (PTMC)), a single Li-ion conducting solid polymer electrolyte with a carboxylate anion, a sulfonylimide anion, or sulfonate anion, a crosslinked electrolyte of poly(ethylene glycol) diacrylate (PEGDA) or poly(ethylene glycol) methyl ether acrylate, a sulfonated derivative thereof, or a combination thereof.

The polymer electrolyte composition preferably contains a polymer that can be cured or cross-linked. This polymer may be initially in a monomer or oligomer state that remains as a liquid which can be injected into the battery cell and then cured or crosslinked after being injected into the cell. Examples include cyanoethyl poly(vinyl alcohol) (PVACN), a pentaerythritol tetraacrylate (PETEA)-based polymer, poly(vinylene carbonate) (PVC), poly(ethylene carbonate) (PEC), poly(propylene carbonate) (PPC), and poly(trimethylene carbonate) (PTMC).

The polymer electrolyte in the second electrolyte composition is designed to further reduce the flammability of the battery cell. In the presently disclosed lithium secondary cell, typically and preferably the first electrolyte is incorporated into the battery cell first. This can be conducted by incorporating the first electrolyte into the cathode before the electrodes, along with the porous separator or ion-permeable membrane, are assembled into a cell. Alternatively, the anode, the cathode, and the porous separator or ion-permeable membrane are assembled into a dry cell, which is then injected with the first electrolyte composition. The first electrolyte does not fully occupy the internal space of the dry cell, leaving some room to accommodate the second electrolyte composition. Once an adequate amount of time is allowed for permeation of the first electrolyte to reach the cathode active materials in the cathode, one may then introduce the second electrolyte composition into the cell. Since the internal structures of the cathode has been substantially loaded with the first electrolyte, the second electrolyte tends to stay near the separator or a space between the anode (anode current collector) and the cathode. This feature is also important in terms of isolating any potential fire-causing event (e.g. constraining any potential thermal runaway event inside the anode, not to easily spread into the cathode, and vice versa).

As indicated earlier, the polymer may be initially in a monomer or oligomer state that remains as a liquid which is capable of being injected and flowed into the battery cell and then cured or crosslinked after being injected into the cell. The polymer electrolyte typically will not permeate into the interior of the anode or the interior of the cathode.

In addition to the non-flammability and high lithium ion transference numbers, there are several additional benefits associated with using the presently disclosed quasi-solid electrolytes. As one example, the quasi-solid electrolyte can significantly enhance cyclic and safety performance of rechargeable lithium batteries through effective suppression of lithium dendrite growth. It is generally accepted that dendrites start to grow in the non-aqueous liquid electrolyte when the anion is depleted in the vicinity of the electrode where plating occurs. In the ultrahigh concentration electrolyte, there is a mass of anions to keep the balance of cations ($Li^r$) and anions near metallic lithium anode. Further, the space charge created by anion depletion is minimal, which is not conducive to dendrite growth. Furthermore, due to both ultrahigh lithium salt concentration and high lithium-ion transference number, the quasi-solid electrolyte provides a large amount of available lithium-ion flux and raises the lithium ionic mass transfer rate between the electrolyte and the lithium electrode, thereby enhancing the lithium deposition uniformity and dissolution during charge/discharge processes. Additionally, the local high viscosity induced by a high concentration will increase the pressure from the electrolyte to inhibit dendrite growth, potentially resulting in a more uniform deposition on the surface of the anode. The high viscosity could also limit anion convection near the deposition area, promoting more uniform deposition of Li ions. These reasons, separately or in combination, are believed to be responsible for the notion that no dendrite-like feature has been observed with any of the large number of rechargeable lithium cells that we have investigated thus far.

As another benefit example, this electrolyte is capable of inhibiting lithium polysulfide dissolution at the cathode of a Li—S cell, thus overcoming the polysulfide shuttle phenomenon and allowing the cell capacity not to decay significantly with time. Consequently, a coulombic efficiency nearing 100% along with long cycle life can be achieved. When a concentrated electrolyte is used, the solubility of lithium polysulfide will be reduced significantly.

The liquid solvent utilized in the instant electrolytes may be selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether (e.g. methyl perfluorobutyl ether, MFE, or ethyl perfluorobutyl ether, EFE), and combinations thereof.

The lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulphonyl) imide, lithium bis(fluorosulphonyl)imide, lithium trifluoromethanesulfonimide (LiTFSI), an ionic liquid lithium salt, or a combination thereof.

The ionic liquid is composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present disclosure. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based lithium salts (not solvent) may be composed of lithium ions as the cation and bis(trifluoromethanesulphonyl)imide, bis(fluorosulphonyl)imide and hexafluorophosphate as anions. For instance, lithium trifluoromethanesulfonimide (LiTFSI) is a particularly useful lithium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

There is also no restriction on the type of the cathode materials that can be used in practicing the present disclosure. For Li—S cells, the cathode active material may contain lithium polysulfide. If the cathode active material includes lithium-containing species (e.g. lithium polysulfide) when the cell is made, there is no need to have a lithium metal pre-implemented in the anode.

The rechargeable lithium metal or lithium-ion cell featuring an organic liquid solvent-based quasi-solid electrolyte containing a high lithium salt concentration may contain a cathode active material selected from, as examples, a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

The disclosure also provides a method of producing the disclosed rechargeable lithium cell, the method comprising:
(A) preparing a lithium cell comprising (i) a cathode having a cathode active material and a first electrolyte in ionic contact with the cathode active material, (ii) an anode having an anode current collector but no anode active material and having no lithium metal when the cell is made, (iii) an optional porous separator or ion-permeable membrane electronically separating the anode and cathode, and (iv) a protecting housing that substantially encloses the cathode, the anode, the optional separator, wherein the lithium cell has an unfilled space; and
(B) introducing a second electrolyte into said unfilled space, wherein the second electrolyte comprises a polymer electrolyte in ionic contact with the first electrolyte and being disposed between the anode and the cathode, between the separator and the cathode, and/or between the separator and the anode.

In certain embodiments, step (A) comprises either a procedure of introducing the first electrolyte in the cathode when the cathode is made and before the cathode is enclosed in the protective housing or a procedure of introducing the first electrolyte in the cathode after the cathode, the anode, and the separator are enclosed in the protective housing.

The first electrolyte may comprise a solution comprising a lithium salt dissolved in a liquid solvent having a salt concentration from 1.5 M to 14.0 M.

The first electrolyte may further comprise a flame-retardant additive that is different in composition than said liquid solvent and is selected from Hydrofluoro ether (FIFE), Trifluoro propylene carbonate (FPC), Methyl nonafluorobutyl ether (MFE), Fluoroethylene carbonate (FEC), Tris (trimethylsilyl)phosphite (TTSPi), Triallyl phosphate (TAP), Ethylene sulfate (DTD), 1,3-propane sultone (PS), Propene sultone (PES), Alkylsiloxane (Si—O), Alkylsilane (Si—C), liquid oligomeric silaxane (—Si—O—Si—), Tetraethylene glycol dimethylether (TEGDME), canola oil, or a combination thereof and said additive-to-said liquid solvent ratio in said mixture is from 5/95 to 95/5 by weight.

The polymer electrolyte preferably comprises a polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

In some embodiments, step (B) comprises a procedure of introducing a precursor monomer, oligomer, or un-cured version of the polymer electrolyte into the unfilled space and then polymerizing and/or curing the precursor inside the battery cell to form the polymer electrolyte.

In some embodiments, step (A) comprises a procedure (i) of assembling the anode, the cathode, and the separator or membrane, along with a cell housing together to form a dry battery cell having initially no electrolyte therein and a procedure (ii) of introducing a first electrolyte into the dry cell, enabling the first electrolyte to permeate into the cathode; and wherein step (B) is conducted after procedure (ii).

The method may further comprise, before step (B), a procedure of removing a desired portion of a liquid solvent from said battery cell to create additional unfilled space.

The following examples are presented primarily for the purpose of illustrating the best mode practice of the present disclosure, not to be construed as limiting the scope of the present disclosure.

Example 1: Some Examples of Electrolytes Used in the First Electrolyte Compositions A wide range of lithium salts can be used as the lithium salt dissolved in an organic liquid solvent (alone or in a mixture with another organic liquid or an ionic liquid). The following are good choices for lithium salts that tend to be dissolved well in selected organic or ionic liquid solvents: lithium borofluoride ($LiBF_4$), lithium trifluoro-methane-sulfonate ($LiCF_3SO_3$), lithium bis-trifluoromethyl sulfonylimide ($LiN(CF_3SO_2)_2$ or LITFSI), lithium bis(oxalato) borate (LiBOB), lithium oxalyldifluoroborate ($LiBF_2C_2O_4$), and lithium bisperfluoroethy-sulfonylimide (LiBETI). A good electrolyte additive for helping to stabilize Li metal is $LiNO_3$. Particularly useful ionic liquid-based lithium salts include: lithium bis(trifluoro methanesulfonyl)imide (LiTFSI).

Preferred organic liquid solvents include: ethylene carbonate (EC), dimethyl carbonate (DMC), methylethyl carbonate (MEC), diethyl carbonate (DEC), propylene carbonate (PC), acetonitrile (AN), vinylene carbonate (VC), allyl ethyl carbonate (AEC), 1,3-dioxolane (DOL), and 1,2-dimethoxyethane (DME).

Preferred flame retardant liquid additives are Hydrofluoro ether (FIFE), Trifluoro propylene carbonate (FPC), Methyl nonafluorobutyl ether (MFE), Fluoroethylene carbonate (FEC), Tris(trimethylsilyl)phosphite (TTSPi), Triallyl phosphate (TAP), Ethylene sulfate (DTD), 1,3-propane sultone (PS), Propene sultone (PES), Diethyl carbonate (DEC), Alkylsiloxane (Si—O), Alkylsilane (Si—C), liquid oligomeric silaxane (—Si—O—Si—), Tetraethylene glycol dimethylether (TEGDME), canola oil.

Preferred ionic liquid solvents may be selected from a room temperature ionic liquid (RTIL) having a cation selected from tetraalkylammonium, di-alkylimidazolium, alkylpyridinium, dialkyl-pyrrolidinium, or dialkylpiperidinium. The counter anion is preferably selected from $BF_4^-$, $B(CN)_4^-$, $CF_3CO_2^-$, $CF_3SO_3^-$, $N(SO_2CF_3)_2^-$, $N(COCF_3)(SO_2CF_3)^-$, or $N(SO_2F)_2^-$. Particularly useful ionic liquid-based solvents include N-n-butyl-N-ethylpyrrolidinium bis(trifluoromethane sulfonyl)imide (BEPyTFSI), N-methyl-N-propylpiperidinium bis(trifluoromethyl sulfonyl)imide ($PP_{13}$TFSI), and N,N-diethyl-N-methyl-N-(2-methoxyethyl) ammonium bis(trifluoromethylsulfonyl)imide.

Example 2: Flash Points and Vapor Pressure of Some Solvents and Additives and Corresponding Quasi-Solid Electrolytes with a Lithium Salt Molecular Ratio of x=0.2

The flash points of several solvents (with or without a liquid flame retardant additive) and their electrolytes having a lithium salt molecular ratio x=0.2 are presented in Table 1 below. It may be noted that, according to the OSHA (Occupational Safety & Health Administration) classification, any liquid with a flash point below 38.7° C. is flammable. However, in order to ensure safety, we have designed our quasi-solid electrolytes to exhibit a flash point significantly, higher than 38.7° C. (by a large margin, e.g. at least increased by 50° and preferably above 150° C.). The data in Table 1 indicate that the addition of a lithium salt to a molecular ratio of 0.2 is normally sufficient to meet these criteria provided a selective additive is added into the liquid solvent. The addition of a second electrolyte, introduced after the first electrolyte was injected and permeated into the cathode, was found to substantially totally suppress the flash point.

TABLE 1

The flash points and vapor pressures of select solvents and their electrolytes with a lithium salt molecular ratio x = 0.2 (approximately 2.5 M).

| Liquid solvent | Flash point (° C.) | Liquid additive (additive/solvent = 25/75) | Flash point (° C.) with x = 0.2 of (Li salt) |
|---|---|---|---|
| DOL (1,3-dioxolane) | 1 | none | 35 ($LiBF_4$) |
| DOL | | TEGDME | 150 ($LiBF_4$) |
| DOL | 1 | none | 76 ($LiCF_3SO_3$) |
| DOL | | Ethylene sulfate (DTD) | 155 ($LiCF_3SO_3$) |
| DEC (diethyl carbonate) | 33 | none | 120 ($LiCF_3SO_3$) |
| DEC | | FPC (Trifluoro propylene carbonate) | >200 ($LiCF_3SO_3$) |

TABLE 1-continued

The flash points and vapor pressures of select solvents and their electrolytes with a lithium salt molecular ratio x = 0.2 (approximately 2.5 M).

| Liquid solvent | Flash point (° C.) | Liquid additive (additive/solvent = 25/75) | Flash point (° C.) with x = 0.2 of (Li salt) |
|---|---|---|---|
| DMC (Dimethyl carbonate) | 18 | none | 87 (LiCF$_3$SO$_3$) |
| DMC | | hydrofluoro ether | >180 (LiCF$_3$SO$_3$) |
| EMC (ethyl methyl carbonate) | 23 | none | 88 (LiBOB) |
| EMC | | MFE | >200 (LiBOB) |
| AN (Acetonitrile) | 6 | none | 65 (LiBF$_4$) |
| AN | | 1,3-propane sultone (PS) | 155 (LiBF$_4$) |
| AN | | Canola oil | 160 (LiBF$_4$) |
| EA (Ethyl acetate) + DOL | −3 | none | 70 (LiBF$_4$) |
| EA + DOL | | Triallyl phosphate (TAP) | >180 (LiBF$_4$) |
| DME (1,2-dimethoxyethane) | −2 | | 55 (LiPF$_6$) |
| DME | | liquid silaxane | 155 (LiPF$_6$) |
| VC (vinylene carbonate) | 53.1 | none | 65 (LiPF$_6$) |
| VC | | Alkyylsilane (Si-C) | >200 (LiPF$_6$) |

* As per OSHA (Occupational Safety & Health Administration) classification, any liquid with a flash point below 38.7° C. is flammable.

Example 3: Pentaerythritol Tetraacrylate (PETEA)-Based Electrolyte for Use in a Second Electrolyte Composition A pentaerythritol tetraacrylate (PETEA)-based polymer electrolyte was prepared by gelation of a precursor solution. The precursor solution comprised 1.5 wt % PETEA (C$_{17}$H$_{20}$O$_8$) as a monomer and 0.1 wt. % azobisdiisobutyronitrile (AIBN, C$_8$H$_{12}$N$_4$) as an initiator dissolved in a liquid electrolyte containing 1M bis(trifluoromethane) sulfonamide lithium (LiTFSI) salt in a mixture of 1,2-dioxolane (DOL)/dimethoxymethane (DME) (1:1 by volume) with 1 wt % LiNO$_3$ additive. This precursor solution was injected into the unfilled space in a battery cell previously loaded with a first electrolyte composition. The precursor solution in the cell was polymerized at 70° C. for half an hour to form the polymer electrolyte in situ.

The radical polymerization of PETEA was thermally initiated by azobisisobutyronitrile (AIBN). The polymerization reaction occurs in liquid electrolyte. The primary radicals derived via the thermal decomposition of AIBN attack the C=C double bond of the PETEA monomer to create four free radicals on the monomer since PETEA possesses four C=C double bonds to be initiated, followed by the chain growth reaction by sequentially adding PETEA monomers to the active sites (i.e., four free radical ends) of initiated monomer. Finally, a three-dimensional network-like polymerized PETEA is formed in liquid electrolyte.

Example 4: Polymer Electrolyte Based on Cyanoethyl Poly(Vinyl Alcohol) (PVA-CN)

Cyanoethyl poly(vinyl alcohol) polymer was prepared by gelation of a precursor solution containing 2 wt. % PVA-CN dissolved in a liquid electrolyte that contained 1M LiPF$_6$ in a mixture solution of ethylene carbonate (EC)/dimethyl carbonate (DMC)/ethylmethyl carbonate (EMC) with a volume ratio of 1:1:1. The precursor solution was injected in an unfilled space in a battery cell and then heated at a temperature of 70° C. to obtain black PVA-CN based polymer electrolyte.

Example 5: Poly(Vinyl Carbonate)-Based Polymer Electrolyte

Liquid vinylene carbonate (VC), in the presence of a lithium salt, can be polymerized into poly(vinyl carbonate) (PVCA) catalyzed by a thermally initialized radical initiator. The lithium salt, lithium difluoro(oxalate) borate (LiDFOB) has the combined chemical structures of lithium bis(oxalate) borate and lithium tetrafluoroborate (LiBF$_4$). In an experiment, 1.43 g LiDFOB was dissolved in to 10 mL VC to obtain a homogeneous and transparent solution (1.0 m LiDFOB in VC, ≈9.6% (w/w)) and then the solution was added with 10 mg AIBN. The precursor solution was injected into an unfilled space in a battery cell, which was maintained at 60° C. for 24 h and 80° C. for 10 h in a vacuum oven to complete polymerization of VC.

Example 6: Preparation of Graphene-Enabled Li$_x$V$_3$O$_8$ Nano-sheets (as a Cathode Active Material in a Rechargeable Lithium Metal Battery) from V$_2$O$_5$ and LiOH All chemicals used in this study were analytical grade and were used as received without further purification. V$_2$O$_5$ (99.6%, Alfa Aesar) and LiOH (99+%, Sigma-Aldrich) were used to prepare the precursor solution. Graphene oxide (GO, 1% w/v obtained in Example 2 above) was used as a structure modifier. First, V$_2$O$_5$ and LiOH in a stoichiometric V/Li ratio of 1:3 were dissolved in actively stirred de-ionized water at 50° C. until an aqueous solution of Li$_x$V$_3$O$_8$ was formed. Then, GO suspension was added while stirring, and the resulting suspension was atomized and dried in an oven at 160° C. to produce the spherical composite particulates of GO/Li$_x$V$_3$O$_8$ nano-sheets. Corresponding Li$_x$V$_3$O$_8$ materials were obtained under comparable processing conditions, but without graphene oxide sheets.

An additional set of graphene-enabled Li$_x$V$_3$O$_8$ nano-sheet composite particulates was produced from V$_2$O$_5$ and LiOH under comparable conditions, but was dried under different atomization temperatures, pressures, and gas flow rates to achieve four samples of composite particulates with four different Li$_x$V$_3$O$_8$ nano-sheet average thicknesses (4.6 nm, 8.5 nm, 14 nm, and 35 nm). A sample of Li$_x$V$_3$O$_8$ sheets/rods with an average thickness/diameter of 76 nm was also obtained without the presence of graphene oxide sheets (but, with the presence of carbon black particles) under the same processing conditions for the graphene-enhanced particulates with a nano-sheet average thickness of 35 nm. It seems that carbon black is not as good a nucleating agent as graphene for the formation of $Li_xV_3O_8$ nano-sheet crystals. The specific capacities and other electrochemical properties of these cathode materials in anode-less Li metal cells having a graphene-protected Cu foil as the anode current collector were investigated.

Example 7: Preparation of Electrodes for Li-Ion Cells Featuring a Quasi-Solid Electrolyte Several dry electrodes containing graphene-enhanced particulates (e.g. comprising lithium cobalt oxide or lithium iron phosphate primary particles embraced by graphene sheets) were prepared by mixing the particulates with a liquid to form a paste without using a binder such as PVDF. The paste was cast onto a surface of a piece of glass, with the liquid medium removed to obtain a dry electrode. Another dry electrode was prepared by directly mixing $LiFePO_4$ primary particles with graphene sheets in an identical liquid to form a paste without using a binder. Again, the paste was then cast to form dry electrodes. These electrodes were made into full cells containing Ag-coated Cu foil as an anode current collector.

The first-cycle discharge capacity data of small anode-less lithium metal cells were obtained. The data show that, as compared to the cells featuring a single conventional electrolyte, the Li cells having two electrolytes (one containing a high lithium salt concentration in an organic liquid solvent, plus a second polymer-based electrolyte) typically exhibit a longer and more stable cycling life, experiencing a significantly lesser extent of capacity decay after a given number of charge/discharge cycles. In addition, the cells having two types of electrolytes as herein disclosed did not suffer from any fire or explosion when a nail penetration test was conducted on them. In contrast, the cells containing conventional lithium salt-organic solvent electrolytes all exhibited thermal runaway problems and caught fires.

It may be further noted that the cathode active material that can be used in the presently invented cell is not limited to lithium cobalt oxide and lithium iron phosphate. There is no particular limitation on the type of electrode active materials that can be used in a Li cell featuring the presently invented quasi-solid electrolyte and an initially lithium metal-free anode.

Example 8: Evaluation of Electrochemical Performance of Various Cells

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined, but excluding the current collector). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Figure 3:
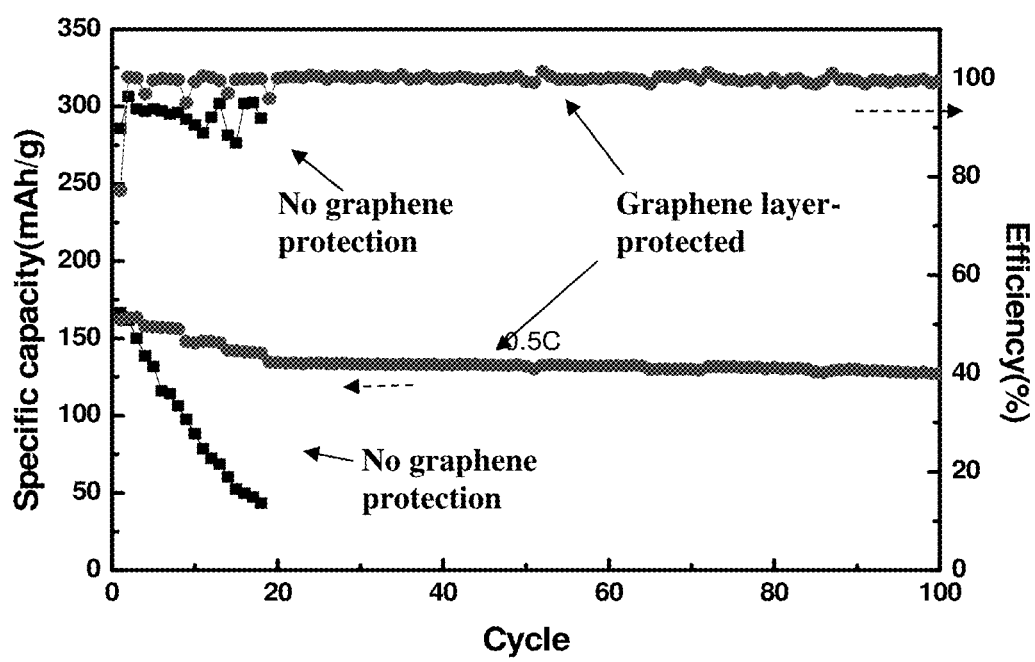
FIG. 3 Cycling performance (discharge specific capacity and Coulomb efficiency) of an anode-less Li metal cell containing an NMC-622 cathode active material.

As an example, the first-cycle efficiency (Coulomb efficiency) of several cells was evaluated using a baseline electrolyte of EC+DEC and two non-flammable electrolytes (NF-1 contains FPC and NF-2 contains FEC). The data have demonstrated that the selected additive can actually increase the Coulomb efficiency of an electrolyte. This is an unexpected and desirable outcome. FIG. 3 shows the discharge curves and Coulombic efficiencies of two anode-less lithium metal cells each containing a first electrolyte (the lithium salt concentrations being 2.4 M, with a flame retardant additive) and a second electrolyte based on PVA-CN discussed above. The first cell has a graphene-protected Cu foil as the anode current collector and the second cell has a neat Cu foil, without a graphene protective layer, as the current collector. These data have demonstrated the significance of having a graphene-based protective layer on a Cu foil surface in imparting cycling stability to the cell.

In summary, the present disclosure provides an innovative, versatile, and surprisingly effective platform materials technology that enables the design and manufacture of superior lithium metal and lithium-ion rechargeable batteries. The approach of adding a second electrolyte, a polymer-based one, imparts additional safety features to battery cells.

The invention claimed is:
1. A rechargeable lithium cell comprising:
(a) a cathode having a cathode active material and a first electrolyte in ionic contact with the cathode active material;
(b) an anode having an anode current collector but no anode active material and having no lithium metal when the cell is made, wherein said anode current collector comprises a foil, perforated sheet, or foam of a metal having two primary surfaces wherein at least one primary surface is coated with or protected by a layer of lithiophilic metal, a layer of graphene material, or both, wherein the lithiophilic metal is selected from Au, Ag, Mg, Zn, Ti, K, Al, Fe, Mn, Co, Ni, Sn, V, Cr, an alloy thereof, or a combination thereof;
(c) a porous separator electronically separating said anode and said cathode; and
(d) a second electrolyte, comprising a polymer electrolyte in ionic contact with the first electrolyte, wherein the polymer electrolyte is disposed substantially between the anode and the cathode, between the separator and the cathode, and/or between the separator and the anode.

2. The rechargeable lithium cell of claim 1, wherein the first electrolyte contains a lithium salt dissolved in a liquid solvent, having a lithium salt concentration C1 from 1.5 M to 14.0 M so that said electrolyte exhibits a vapor pressure less than 0.01 kPa when measured at 20° C., a vapor pressure less than 60% of the vapor pressure of said liquid solvent alone, a flash point at least 20 degrees Celsius higher than a flash point of said liquid solvent alone, a flash point higher than 150° C., or no flash point.

3. The rechargeable lithium cell of claim 2, wherein said first electrolyte further comprises a flame-retardant additive, different in composition than said liquid solvent, and the flame-retardant additive is selected from hydrofluoro ether (HFE), trifluoro propylene carbonate (FPC), methyl nonafluorobutyl ether (MFE), fluoroethylene carbonate (FEC), tris(trimethylsilyl)phosphite (TTSPi), triallyl phosphate (TAP), ethylene sulfate (DTD), 1,3-propane sultone (PS), propene sultone (PES), alkylsiloxane (Si—O), alkylsilane (Si—C), liquid oligomeric silaxane (—Si—O—Si—), tetraethylene glycol dimethylether (TEGDME), canola oil, or a combination thereof and said flame-retardant additive-to-said liquid solvent ratio is from 5/95 to 95/5 by weight.

4. The rechargeable lithium cell of claim 3, wherein said flame-retardant additive-to-said liquid solvent ratio is from 15/85 to 85/15 by weight.

5. The rechargeable lithium cell of claim 2, wherein said liquid solvent is selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (□-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, and combinations thereof.

6. The rechargeable lithium cell of claim 2, wherein said lithium salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

7. The rechargeable lithium cell of claim 2, wherein a molar fraction or molecular fraction of said lithium salt in said first electrolyte is greater than 0.2 and up to 0.99.

8. The rechargeable lithium cell of claim 1, wherein said anode or said cathode is substantially free of the polymer electrolyte.

9. The rechargeable lithium cell of claim 1, which is a lithium metal secondary cell, a lithium-ion cell, a lithium-sulfur cell, a lithium-ion sulfur cell, a lithium-selenium cell, or a lithium-air cell.

10. The rechargeable lithium cell of claim 1, wherein said first electrolyte is selected from a liquid electrolyte, an ionic liquid electrolyte, a polymer electrolyte, a polymer gel electrolyte, an inorganic solid electrolyte, a catholyte, or a combination thereof.

11. The rechargeable lithium cell of claim 10, wherein said ionic liquid is selected from a room temperature ionic liquid having a cation selected from tetraalkylammonium, di-, tri-, or tetra-alkylimidazolium, alkylpyridinium, dialkylpyrrolidinium, dialkylpiperidinium, tetraalkylphosphonium, trialkylsulfonium, or a combination thereof.

12. The rechargeable lithium cell of claim 10, wherein said ionic liquid is selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

13. The rechargeable lithium cell of claim 1, wherein said anode current collector comprises a foil, perforated sheet, or foam of a metal having two primary surfaces wherein at least one primary surface is coated with or protected by a layer of lithiophilic metal, a layer of graphene material, or both.

14. The rechargeable lithium cell of claim 13, wherein the metal foil, perforated sheet, or foam is selected from Cu, Ni, stainless steel, Al, graphene-coated metal, graphite-coated metal, carbon-coated metal, or a combination thereof.

15. The rechargeable lithium cell of claim 1, wherein said separator comprises polymeric fibers, ceramic fibers, glass fibers, particles of a glass or ceramic material, or a combination thereof.

16. The rechargeable lithium cell of claim 1, wherein said polymer electrolyte comprises a polymer selected from poly(ethylene oxide), polypropylene oxide, poly(ethylene glycol), poly(acrylonitrile), poly(methyl methacrylate), poly bis-methoxy ethoxyethoxide-phosphazenex, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

17. A rechargeable lithium cell comprising:
(a) a cathode having a cathode active material and a first electrolyte in ionic contact with the cathode active material;
(b) an anode having an anode current collector but no anode active material and having no lithium metal when the cell is made, wherein said anode current collector comprises a foil, perforated sheet, or foam of a metal having two primary surfaces wherein at least one primary surface is coated with or protected by a layer of lithiophilic metal, a layer of graphene material, or both, wherein the graphene layer comprises graphene sheets selected from single-layer or few-layer graphene, wherein said few-layer graphene sheets have 2-10 layers of stacked graphene planes having an inter-plane spacing $d_{002}$ from 0.3354 nm to 0.6 nm as measured by X-ray diffraction and said single-layer or few-layer graphene sheets contain a pristine graphene material having essentially zero % of non-carbon elements, or a non-pristine graphene material having 0.001% to 45% by weight of non-carbon elements;
(c) a porous separator electronically separating said anode and said cathode; and
(d) a second electrolyte, comprising a polymer electrolyte in ionic contact with the first electrolyte, wherein the polymer electrolyte is disposed substantially between the anode and the cathode, between the separator and the cathode, and/or between the separator and the anode.

18. The rechargeable lithium cell of claim 17, wherein said non-pristine graphene is selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

19. The rechargeable lithium cell of claim 17, wherein the first electrolyte contains a lithium salt dissolved in a liquid solvent, having a lithium salt concentration C1 from 1.5 M to 14.0 M so that said electrolyte exhibits a vapor pressure less than 0.01 kPa when measured at 20° C., a vapor pressure less than 60% of the vapor pressure of said liquid solvent alone, a flash point at least 20 degrees Celsius higher than a flash point of said liquid solvent alone, a flash point higher than 150° C., or no flash point.

20. The rechargeable lithium cell of claim 19, wherein said first electrolyte further comprises a flame-retardant additive, different in composition than said liquid solvent, and the flame-retardant additive is selected from hydrofluoro ether (IFE), trifluoro propylene carbonate (FPC), methyl nonafluorobutyl ether (MFE), fluoroethylene carbonate (FEC), tris(trimethylsilyl)phosphite (TTSPi), triallyl phosphate (TAP), ethylene sulfate (DTD), 1,3-propane sultone (PS), propene sultone (PES), alkylsiloxane (Si—O), alkylsilane (Si—C), liquid oligomeric silaxane (—Si—O—Si—), tetraethylene glycol dimethylether (TEGDME), canola oil, or a combination thereof and said flame-retardant additive-to-said liquid solvent ratio is from 5/95 to 95/5 by weight.

21. The rechargeable lithium cell of claim 20, wherein said flame-retardant additive-to-said liquid solvent ratio is from 15/85 to 85/15 by weight.

22. The rechargeable lithium cell of claim 19, wherein said liquid solvent is selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (□-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, and combinations thereof.

23. The rechargeable lithium cell of claim 19, wherein said lithium salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

24. The rechargeable lithium cell of claim 19, wherein a molar fraction or molecular fraction of said lithium salt in said first electrolyte is greater than 0.2 and up to 0.99.

25. The rechargeable lithium cell of claim 17, wherein said anode or said cathode is substantially free of the polymer electrolyte.

26. The rechargeable lithium cell of claim 17, which is a lithium metal secondary cell, a lithium-ion cell, a lithium-sulfur cell, a lithium-ion sulfur cell, a lithium-selenium cell, or a lithium-air cell.

27. The rechargeable lithium cell of claim 17, wherein said first electrolyte is selected from a liquid electrolyte, an ionic liquid electrolyte, a polymer electrolyte, a polymer gelelectrolyte, an inorganic solid electrolyte, a catholyte, or a combination thereof.

28. The rechargeable lithium cell of claim 27, wherein said ionic liquid is selected from a room temperature ionic liquid having a cation selected from tetraalkylammonium, di-, tri-, or tetra-alkylimidazolium, alkylpyridinium, dialkyl-pyrrolidinium, dialkylpiperidinium, tetraalkylphosphonium, trialkylsulfonium, or a combination thereof.

29. The rechargeable lithium cell of claim 27, wherein said ionic liquid is selected from a room temperature ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

30. The rechargeable lithium cell of claim 17, wherein said anode current collector comprises a foil, perforated sheet, or foam of a metal having two primary surfaces wherein at least one primary surface is coated with or protected by a layer of lithiophilic metal, a layer of graphene material, or both.

31. The rechargeable lithium cell of claim 30, wherein the metal foil, perforated sheet, or foam is selected from Cu, Ni, stainless steel, Al, graphene-coated metal, graphite-coated metal, carbon-coated metal, or a combination thereof.

32. The rechargeable lithium cell of claim 17, wherein said separator comprises polymeric fibers, ceramic fibers, glass fibers, particles of a glass or ceramic material, or a combination thereof.

33. The rechargeable lithium cell of claim 17, wherein said polymer electrolyte comprises a polymer selected from poly(ethylene oxide), polypropylene oxide, poly(ethylene glycol), poly(acrylonitrile), poly(methyl methacrylate), poly bis-methoxy ethoxyethoxide-phosphazenex, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof.

* * * * *